United States Patent
Hanrahan et al.

(10) Patent No.: US 12,378,000 B2
(45) Date of Patent: Aug. 5, 2025

(54) AIRCRAFT PROPULSION SYSTEM GEARTRAIN

(71) Applicant: RTX Corporation, Farmington, CT (US)

(72) Inventors: Paul R. Hanrahan, Sedona, AZ (US); Benjamin T. Mylrea, Jupiter, FL (US); David A. Stachowiak, Manchester, CT (US)

(73) Assignee: RTX Corporation, Farmington, CT (US)

( * ) Notice: Subject to any disclaimer, the term of this patent is extended or adjusted under 35 U.S.C. 154(b) by 9 days.

(21) Appl. No.: 18/233,620

(22) Filed: Aug. 14, 2023

(65) Prior Publication Data

US 2025/0058888 A1 Feb. 20, 2025

Related U.S. Application Data

(60) Provisional application No. 63/397,632, filed on Aug. 12, 2022.

(51) Int. Cl.
*B64D 35/02* (2024.01)
*F02C 7/36* (2006.01)

(52) U.S. Cl.
CPC ............. *B64D 35/02* (2013.01); *F02C 7/36* (2013.01); *F05D 2220/323* (2013.01); *F05D 2260/40311* (2013.01); *F05D 2260/902* (2013.01)

(58) Field of Classification Search
CPC ............. F02C 7/36; F05D 2260/40311; F05D 2220/323; F05D 2260/902; B64D 35/02
See application file for complete search history.

(56) References Cited

U.S. PATENT DOCUMENTS

| | | | |
|---|---|---|---|
| 3,368,347 A * | 2/1968 | Wickman | F02C 3/113 477/30 |
| 4,651,521 A | 3/1987 | Ossi | |
| 6,270,037 B1 * | 8/2001 | Freese | F02K 3/025 60/233 |
| 10,822,101 B2 | 11/2020 | Murrow | |
| 10,954,813 B2 | 3/2021 | Wuestenberg | |
| 11,186,378 B2 | 11/2021 | Dubreuil | |
| 2018/0135512 A1 | 5/2018 | Poulin | |
| 2018/0230902 A1 * | 8/2018 | Desjardins | F16H 1/28 |
| 2018/0266316 A1 * | 9/2018 | Soulat | F02C 3/10 |

(Continued)

OTHER PUBLICATIONS

EP Search Report for EP Patent Application No. 23191414.4 dated Jan. 19, 2024.

*Primary Examiner* — David P. Olynick
(74) *Attorney, Agent, or Firm* — Getz Balich LLC

(57) ABSTRACT

An assembly is provided for an aircraft. This assembly includes a geartrain, a first propulsor rotor and a rotating structure. The geartrain includes a sun gear, a ring gear, a plurality of intermediate gears and a carrier. The ring gear circumscribes the sun gear and is rotatable about an axis. Each of the intermediate gears is between and meshed with the sun gear and the ring gear. Each of the intermediate gears is rotatably mounted to the carrier. The carrier is rotatable about the axis. The first propulsor rotor is coupled to the carrier. The rotating structure is coupled to the ring gear. The rotating structure includes a turbine rotor. The rotating structure is configured to drive rotation of the first propulsor rotor through the geartrain.

18 Claims, 8 Drawing Sheets

(56) References Cited

U.S. PATENT DOCUMENTS

| | | | |
|---|---|---|---|
| 2019/0024582 A1* | 1/2019 | Poulin | F02C 6/206 |
| 2020/0017229 A1 | 1/2020 | Steinert | |
| 2020/0307812 A1* | 10/2020 | Dubreuil | B64D 41/00 |
| 2021/0078700 A1 | 3/2021 | Klemen | |
| 2021/0229796 A1* | 7/2021 | Mitrovic | B64C 27/14 |
| 2022/0235699 A1 | 7/2022 | Desjardins | |

* cited by examiner

AIRCRAFT PROPULSION SYSTEM GEARTRAIN

This application claims priority to U.S. Provisional Patent Application No. 63/397,632 filed Aug. 12, 2022, which is hereby incorporated herein by reference in its entirety.

BACKGROUND OF THE DISCLOSURE

1. Technical Field

This disclosure relates generally to an aircraft propulsion system and, more particularly, to a geartrain for the aircraft propulsion system.

2. Background Information

Various types and configurations of geartrains for an aircraft propulsion system are known in the art for an aircraft. While these known aircraft propulsion system geartrains have various benefits, there is still room in the art for improvement.

SUMMARY OF THE DISCLOSURE

According to an aspect of the present disclosure, an assembly is provided for an aircraft. This assembly includes a geartrain, a first propulsor rotor and a rotating structure. The geartrain includes a sun gear, a ring gear, a plurality of intermediate gears and a carrier. The ring gear circumscribes the sun gear and is rotatable about an axis. Each of the intermediate gears is between and meshed with the sun gear and the ring gear. Each of the intermediate gears is rotatably mounted to the carrier. The carrier is rotatable about the axis. The first propulsor rotor is coupled to the carrier. The rotating structure is coupled to the ring gear. The rotating structure includes a turbine rotor. The rotating structure is configured to drive rotation of the first propulsor rotor through the geartrain.

According to another aspect of the present disclosure, another assembly is provided for an aircraft. This assembly includes a geartrain, a propulsor rotor and a rotating structure. The geartrain includes a sun gear, a ring gear, a plurality of intermediate gears and a carrier. The sun gear is rotatable about an axis. The ring gear circumscribes the sun gear and is rotatable about the axis. Each of the intermediate gears is between and meshed with the sun gear and the ring gear. Each of the intermediate gears is rotatably mounted to the carrier. The propulsor rotor is coupled to the sun gear. The rotating structure is coupled to the ring gear. The rotating structure includes a turbine rotor. The rotating structure is configured to drive rotation of the propulsor rotor through the geartrain.

According to still another aspect of the present disclosure, another assembly is provided for an aircraft. This assembly includes a geartrain, a power output and a power input. The geartrain includes a sun gear, a ring gear, a plurality of intermediate gears and a carrier. The sun gear is rotatable about an axis. The ring gear circumscribes the sun gear and is rotatable about the axis. Each of the intermediate gears is between and meshed with the sun gear and the ring gear. Each of the intermediate gears is rotatably mounted to the carrier. The carrier is rotatable about the axis. The power output is coupled to the carrier or the sun gear. The power input is coupled to the ring gear. The power input is configured to drive rotation of the power output through the geartrain.

The power output may be configured as or otherwise include a propulsor rotor.

The power output may be configured as or otherwise include a generator rotor.

The power input may be configured as or otherwise include a turbine rotor within a turbine section of a gas turbine engine core.

The power output may be coupled to the carrier.

The power output may be coupled to the sun gear.

The assembly may also include a second power output. The power output may be coupled to the carrier, and the second power output may be coupled to the sun gear. The power input may also be configured to drive rotation of the second power output through the geartrain.

The carrier may be rotatable about the axis.

The assembly may also include a first propulsor rotor coupled to the carrier, where the propulsor rotor may be a second propulsor rotor. The rotating structure may be configured to drive rotation of the first propulsor rotor through the geartrain.

The assembly may also include a lock device configured to lock rotation of the carrier about the axis.

The lock device may be configured as or otherwise include a splined coupling.

The assembly may also include a brake configured to brake rotation of the carrier about the axis.

The brake may be configured as or otherwise include a disk brake.

The sun gear may be rotatable about the axis.

The assembly may also include a lock device configured to lock rotation of the sun gear about the axis.

The lock device may be configured as or otherwise include a splined coupling.

The assembly may also include a brake configured to brake rotation of the sun gear about the axis.

The brake may be configured as or otherwise include a disk brake.

The assembly may also include a second propulsor rotor coupled to the sun gear. The rotating structure may be configured to drive rotation of the second propulsor rotor through the geartrain.

The first propulsor rotor may be rotatable about a first rotor axis. The second propulsor rotor may be rotatable about a second rotor axis that is angularly offset from the first rotor axis.

The first rotor axis may be coaxial with the axis.

The first propulsor rotor may be configured to generate propulsive force in a first direction. The second propulsor rotor may be configured to generate propulsive force in a second direction that is different than the first direction.

The first propulsor rotor may be configured as or otherwise include a ducted rotor. In addition or alternatively, the second propulsor rotor may be configured as or otherwise include an open rotor.

The assembly may also include a gas turbine engine core including a compressor section, a combustor section, a turbine section and the rotating structure. The turbine rotor may be within the turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
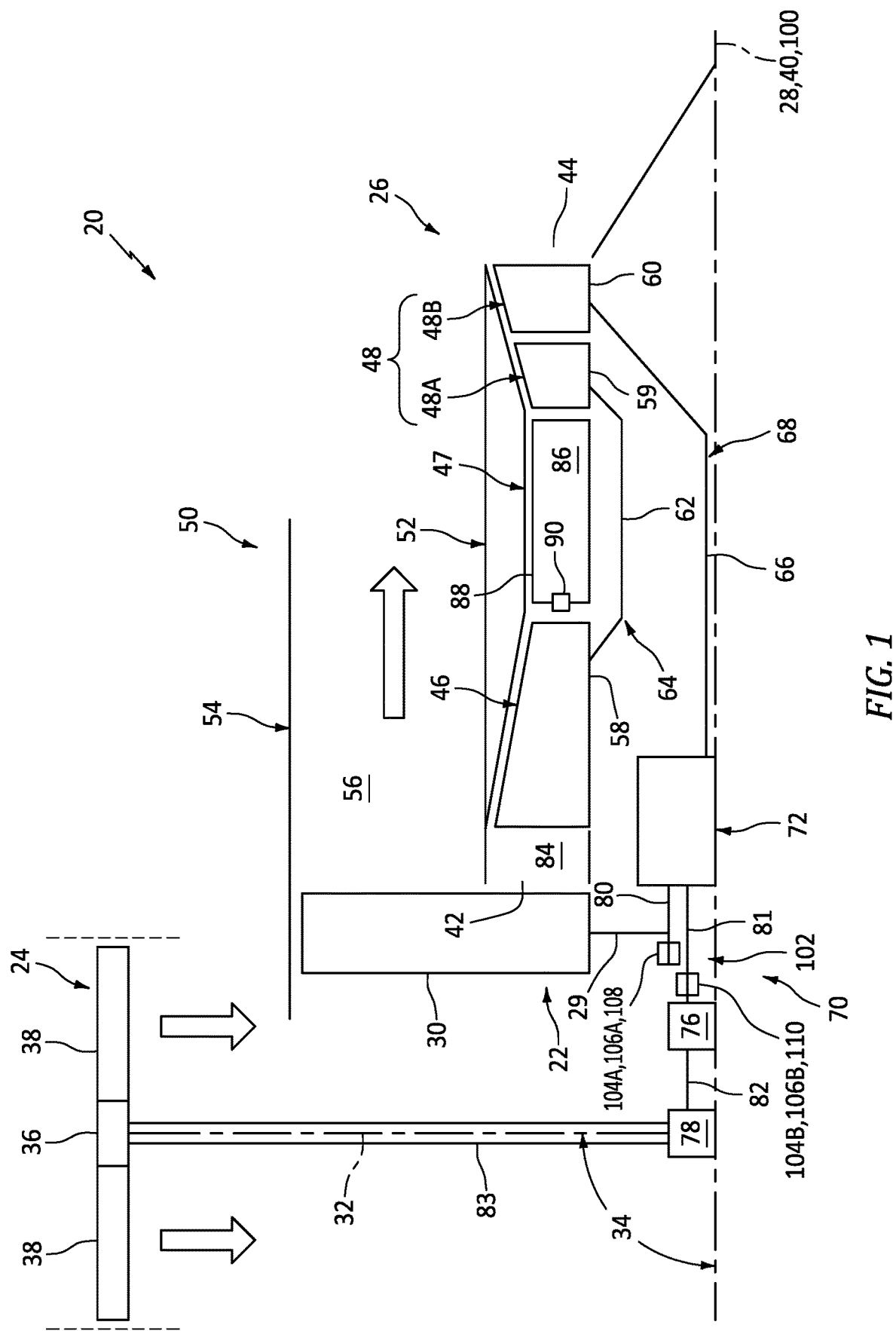
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis. The aircraft propulsion system 20, of course, may also be configured to generate both the first direction propulsion (e.g., horizontal propulsion) and the second direction propulsion (e.g., vertical propulsion) during a third mode (e.g., a transition mode) of operation.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a gas turbine engine core 26 configured to rotatably drive the one or more propulsor rotors—the first propulsor rotor 22 and/or the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground and/or during level aircraft flight. The first propulsor rotor 22 includes at least a first rotor disk 29 and a plurality of first rotor blades 30 (one visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground and/or during level aircraft flight. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground and/or during level aircraft flight. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a (e.g., annular) bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components 60 and 66 collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 76 and a gearing 78; e.g., bevel gearing. The powertrain 70 of FIG. 1 also includes one or more shafts 80-83 and/or other torque transmission devices for coupling the geartrain 72 to the first propulsor rotor 22 and the second propulsor rotor 24.

An input to the geartrain 72 is coupled to the low speed rotating structure 68 and its low speed shaft 66, where the low speed rotating structure 68 forms a power input for the geartrain 72. A first output from the geartrain 72 is coupled to the first propulsor rotor 22 through the first propulsor shaft 80, where the first propulsor rotor 22 forms a first power output (e.g., load) for the geartrain 72. A second output from the geartrain 72 is coupled to the second propulsor rotor 24 through the powertrain elements 81, 76, 82, 78 and 83, where the second propulsor rotor 24 forms a second power output (e.g., load) for the geartrain 72.

An output of the transmission 76 is connected to the gearing 78 through the transmission output shaft 82. This transmission 76 may be configured to selectively couple (e.g., transfer mechanical power between) the geartrain output shaft 81 and the transmission output shaft 82. During the first mode of operation, for example, the transmission 76 may be configured to decouple the geartrain output shaft 81 from the transmission output shaft 82, thereby decoupling the low speed rotating structure 68 from the second propulsor rotor 24. During the second mode of operation (and the third mode of operation), the transmission 76 may be configured to couple the geartrain output shaft 81 with the transmission output shaft 82, thereby coupling the low speed rotating structure 68 with the second propulsor rotor 24. The transmission 76 may be configured as a clutched or clutchless transmission.

An output of the gearing 78 is connected to the second propulsor rotor 24 through the second propulsor shaft 83. This gearing 78 provides a coupling between the transmission output shaft 82 rotating about the axis 28, 40 and the second propulsor shaft 83 rotating about the second rotor axis 32. The gearing 78 may also provide a speed change mechanism between the transmission output shaft 82 and the second propulsor shaft 83. The gearing 78, however, may alternatively provide a 1:1 rotational coupling between the transmission output shaft 82 and the second propulsor shaft 83 such that these shafts 82 and 83 rotate at a common (e.g., the same) speed. Furthermore, in some embodiments, the gearing 78 and the transmission output shaft 82 may be omitted where the functionality of the gearing 78 is integrated into the transmission 76. In still other embodiments, the transmission 76 may be omitted where decoupling of the second propulsor rotor 24 is not required and/or where an optional additional speed change between the second output of the geartrain 72 and the second propulsor rotor 24 is not required.

During operation of the aircraft propulsion system 20, air enters the engine core 26 through the airflow inlet 42. This air is directed into a (e.g., annular) core flowpath 84 which extends sequentially through the compressor section 46, the combustor section 47, the HPT section 48A and the LPT section 48B to the exhaust 44. The air within this core flowpath 84 may be referred to as core air.

The core air is compressed by the compressor rotor 58 and directed into a (e.g., annular) combustion chamber 86 of a (e.g., annular) combustor 88 in the combustor section 47. Fuel is injected into the combustion chamber 86 through one or more fuel injectors 90 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 drives rotation of the first propulsor rotor 22 through the geartrain 72 during a select mode or modes of operation; e.g., the first and the third modes of operation. The rotation of the low speed rotating structure 68 drives rotation of the second propulsor rotor 24 through the geartrain 72 during a select mode or modes of operation; e.g., the second and the third modes of operation. During the first mode of operation, the transmission 76 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During the first and the third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and the third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and the third modes of operation, and the aircraft may fly forward or otherwise move during the first and the third modes of operation.

Figure 2:
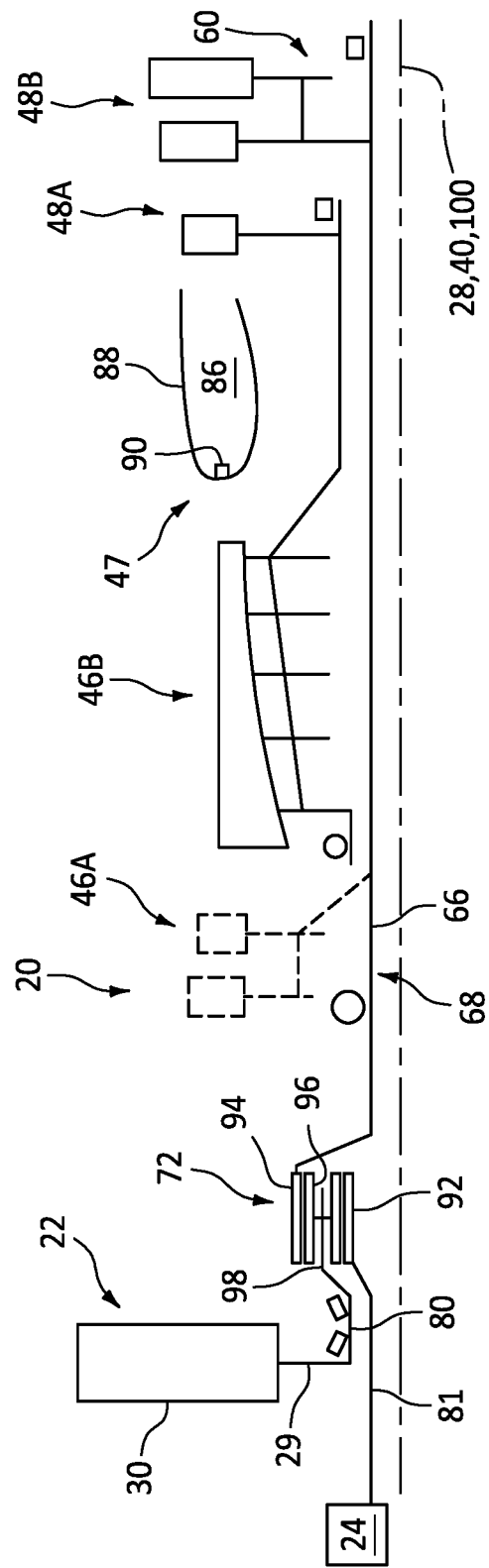
FIG. 2 is a schematic illustration of a portion of the aircraft propulsion system of FIG. 1 shown with an optional low pressure compressor section.
Figure 3:
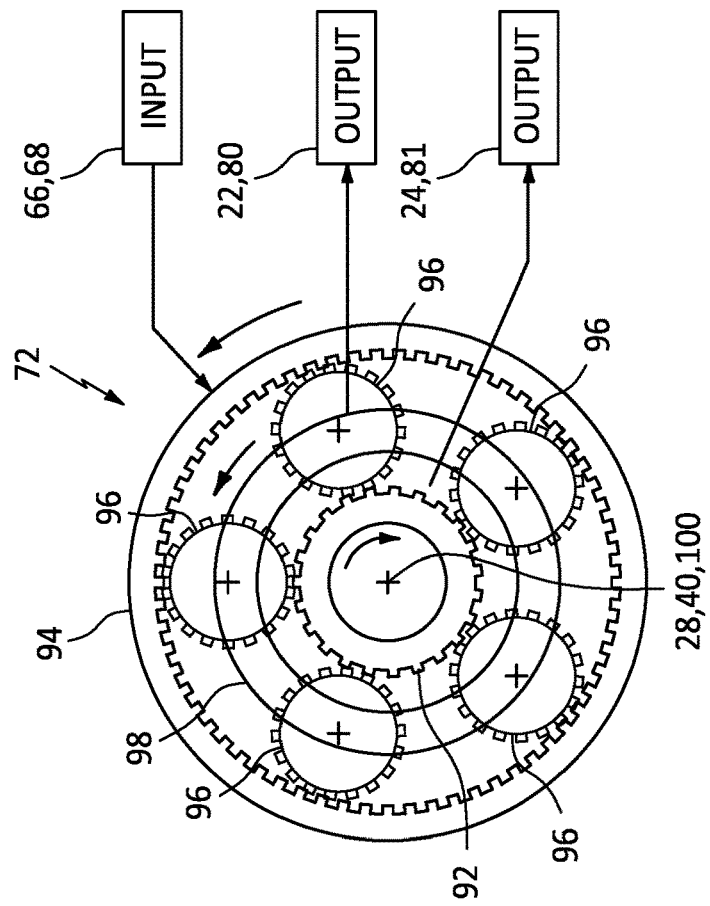
FIG. 3 is a schematic illustration of a geartrain coupled with a power input and one or more power outputs.

FIGS. 2 and 3 illustrate aspects of the geartrain 72 in further detail. The geartrain 72 of FIGS. 2 and 3 includes a sun gear 92, a ring gear 94, a plurality of intermediate gears 96 and a carrier 98. The sun gear 92 is rotatable about a rotational axis 100 of the geartrain 72, which rotational axis 100 may be parallel (e.g., coaxial) with the axis 28, 40. The ring gear 94 circumscribes the sun gear 92, and the ring gear 94 is rotatable about the axis 28, 40, 100. Each of the intermediate gears 96 is disposed (e.g., radially) between and meshed with the sun gear 92 and the ring gear 94. Each of the intermediate gears 96 is rotatably mounted to the carrier 98. The carrier 98 is rotatable about the axis 28, 40, 100. The first propulsor rotor 22 is coupled to and is configured to be rotatably driven by the carrier 98. The second propulsor rotor 24 is coupled to and is configured to be rotatably driven by the sun gear 92. The low speed rotating structure 68 and its LPT rotor 60 are coupled to and is configured to rotatably drive the ring gear 94. With this arrangement, the geartrain 72 may provide a propulsor rotor (e.g., fan) to LPT rotor speed ratio capable of configuring the first propulsor rotor 22 with a relatively high pressure ratio (e.g., fan pressure ratio (FPR)) while rotating the low speed rotating structure 68 and its LPT rotor 60 at relatively fast rotational speeds.

Referring to FIG. 1, the aircraft propulsion system 20 may include a propulsor rotation control system 102. This propulsor rotation control system 102 may include one or more brakes 104A and 104B (generally referred to as "104") and/or one or more lock devices 106A and 106B (generally referred to as "106").

Figure 4:
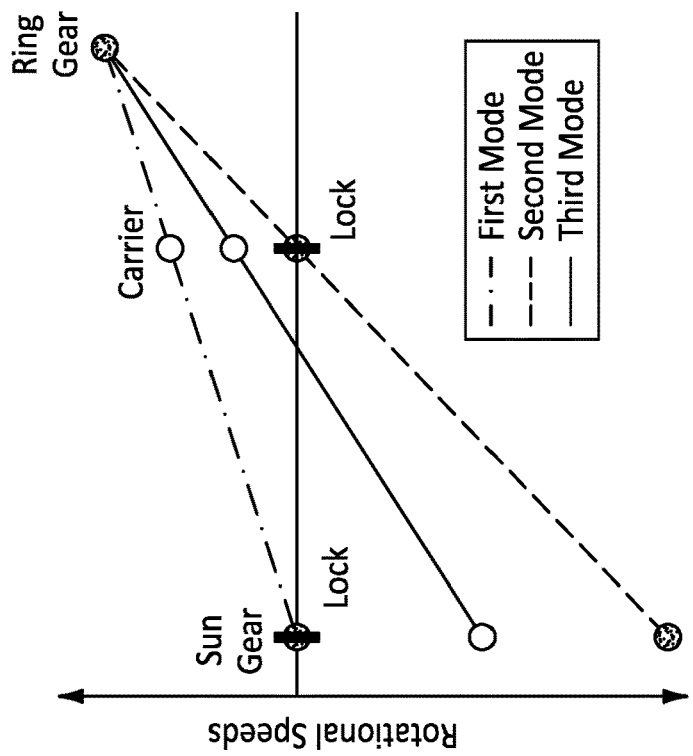
FIG. 4 is a graph depicting changes to rotational speeds during various modes of propulsion system operation.

The first brake 104A and/or the first lock device 106A may be located at location 108, or another suitable location. The first brake 104A is configured to brake (e.g., slow and/or stop) rotation of the first propulsor rotor 22 about the axis 28, 40, 100. The first lock device 106A is configured to lock (e.g., fix, prevent) rotation of the first propulsor rotor 22 about the axis 28, 40, 100, for example, following the braking of the first propulsor rotor 22 to a zero rotational speed about the axis 28, 40, 100 using the first brake 104A. When the first propulsor rotor 22 is rotationally fixed (e.g., during the second mode of operation of FIG. 4), the geartrain 72 may transfer (e.g., all, minus losses in the powertrain 70) the power output from the low speed rotating structure 68 and its LPT rotor 60 to the second propulsor rotor 24 and the powertrain element(s) therebetween.

The second brake 104B and/or the second lock device 106B may be located at location 110, or another suitable location. The second brake 104B is configured to brake (e.g., slow and/or stop) rotation of the second propulsor rotor 24 about the axis 32. The second lock device 106B is configured to lock (e.g., fix, prevent) rotation of the second propulsor rotor 24 about the axis 32, for example, following the braking of the second propulsor rotor 24 to a zero rotational speed about the axis 32. When the second propulsor rotor 24 is rotationally fixed (e.g., during the first mode of operation of FIG. 4), the geartrain 72 may transfer (e.g., all, minus losses in the powertrain 70) the power output from the low speed rotating structure 68 and its LPT rotor 60 to the first propulsor rotor 22 and the powertrain element(s) therebetween.

To enter the third mode of operation from the first mode of operation, the second lock device 106B may be disengaged and/or the second brake 104B may be released. The second propulsor rotor 24 may thereby begin to rotate along with the already rotating first propulsor rotor 22. Similarly, to enter the third mode of operation from the second mode of operation, the first lock device 106A may be disengaged and/or the first brake 104A may be released. The first propulsor rotor 24 may thereby begin to rotate along with the already rotating second propulsor rotor 24. When both of the propulsor rotors 22 and 24 are rotating/free to rotate (e.g., during the third mode of operation of FIG. 4), the geartrain 72 may transfer (e.g., all, minus losses in the powertrain 70) the power output from the low speed rotating structure 68 and its LPT rotor 60 to (I) the first propulsor rotor 22 and the powertrain element(s) therebetween and (II) the second propulsor rotor 24 and the powertrain element(s) therebetween.

Figure 5:
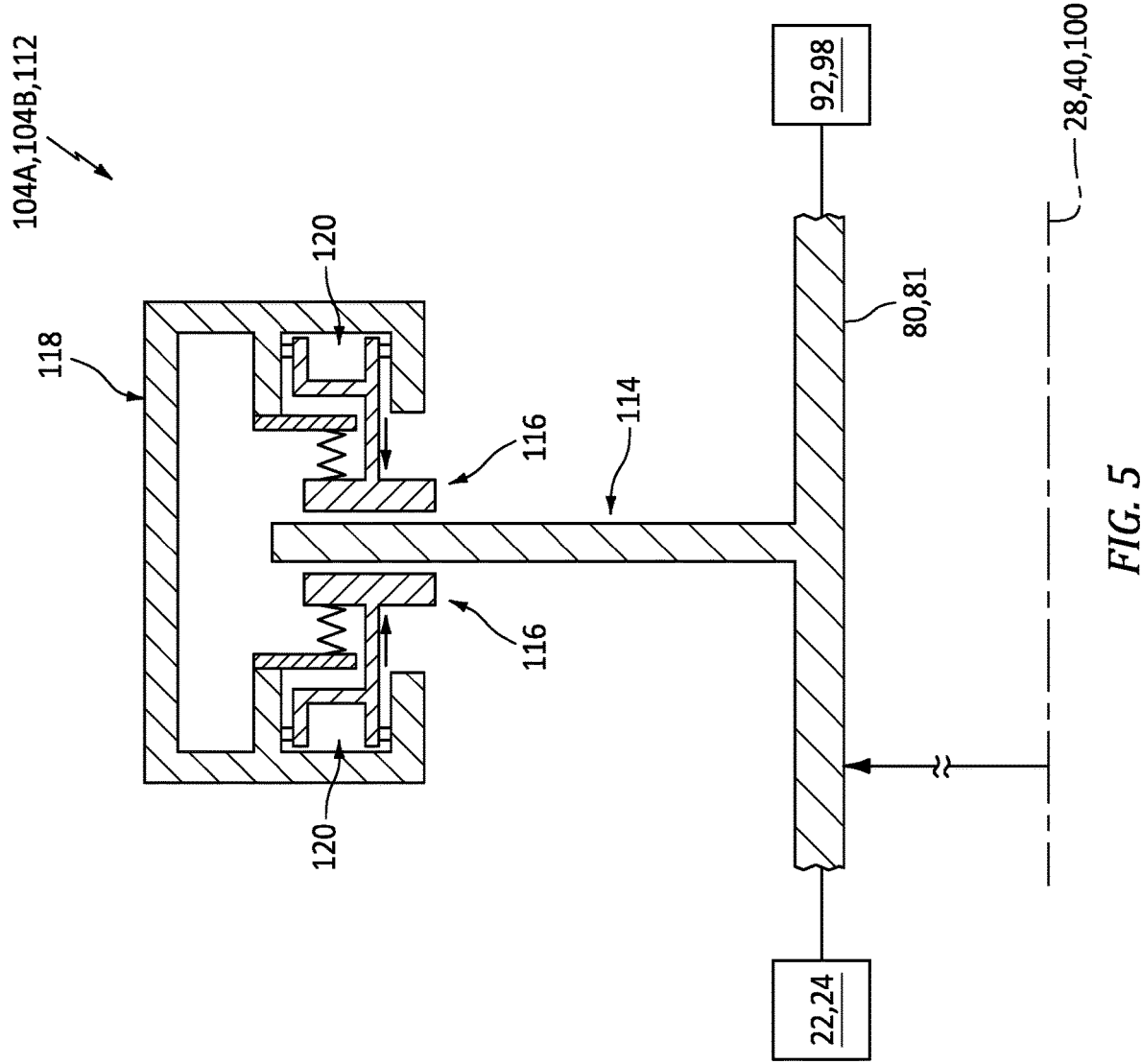
FIG. 5 is a partial sectional illustration of a rotating assembly configured with a brake.

Referring to FIG. 5, the first brake 104A and/or the second brake 104B may each be configured as or otherwise include a disk brake 112. The disk brake 112 of FIG. 5 includes a brake rotor 114 and one or more brake pads 116. The brake rotor 114 is configured rotatable with the respective propulsor rotor 22, 24. The brake rotor 114, for example, may be connected to and rotatable with the respective shaft 80, 81, or another rotating element (directly or indirectly) rotatable with the respective propulsor rotor 22, 24. The brake pads 116 are anchored to a stationary structure 118, which may be part of the engine housing 50 and/or an airframe of the aircraft (see FIG. 1). The brake pads 116 may be actuated by one or more brake actuators 120 (e.g., hydraulic brake actuators) to move the brake pads 116 from an open position to a closed position. In the open position, the brake pads 116 are spaced from and do not engage (e.g., contact) the brake rotor 114 (see position of FIG. 5). In the closed position, the brake pads 116 engage (e.g., contact) and clamp onto (e.g., squeeze) the brake rotor 114. Frictional rubbing between the brake pads 116 and the brake rotor 114 is operable to brake rotation of the brake rotor 114 and, thus, the respective shaft 80, 81 (or other rotating element) connected thereto. The first and the second brakes 104 of the present disclosure, however, are not limited to such an exemplary disk brake configuration. Furthermore, it is contemplated the first and/or the second brake 104 may alternatively be configured as another type of brake such as, for example, a drum brake.

Figure 6:
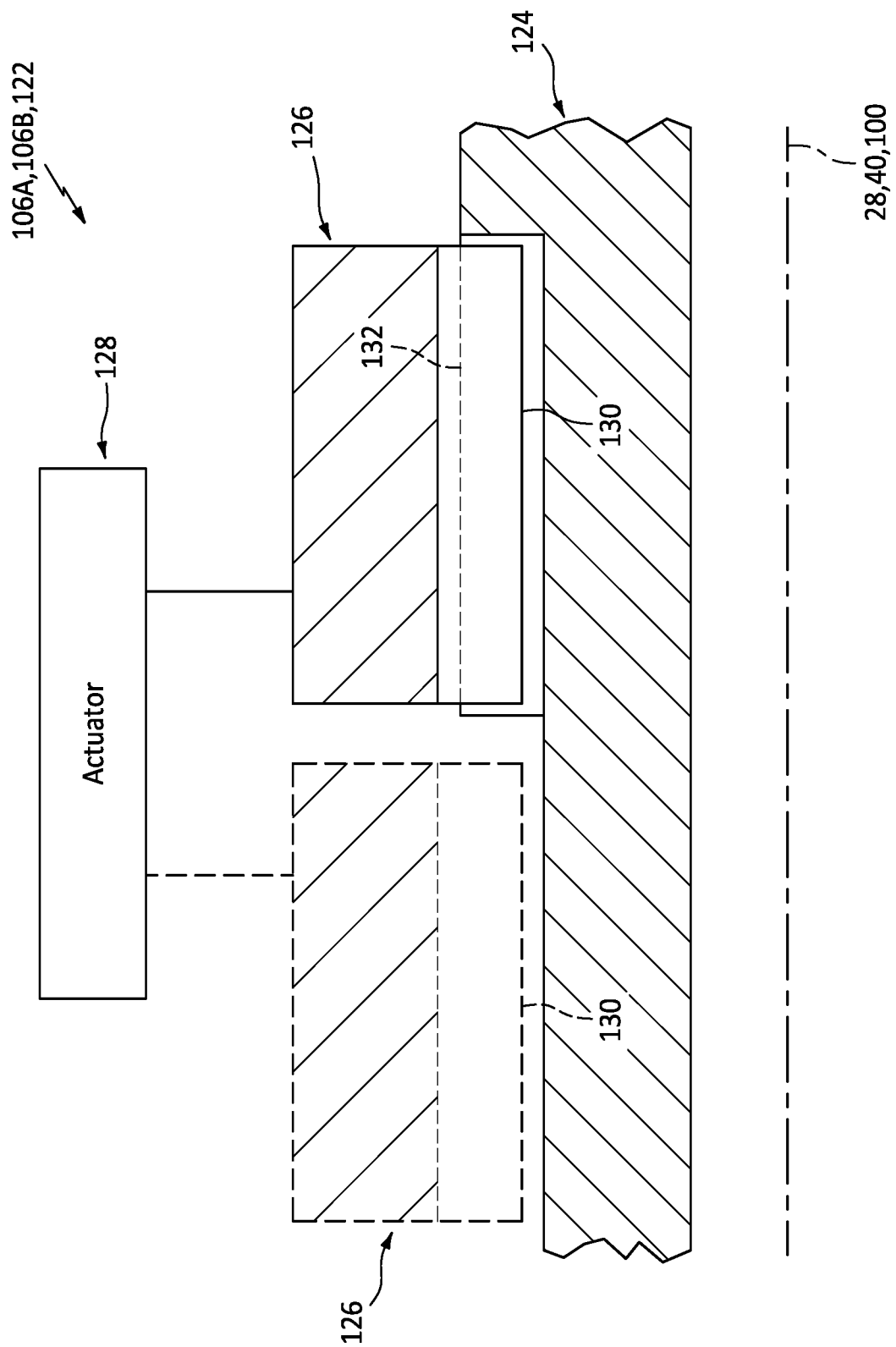
FIG. 6 is a partial, side sectional schematic illustration of a lock device.

Referring to FIG. 6, the first lock device 106A and/or the second lock device 106B may each be configured as a splined lock device 122; e.g., a splined coupling. The lock device 122 of FIG. 6, for example, includes an inner lock element 124 (e.g., a splined shaft), an outer lock element 126 (e.g., a splined sleeve) and an actuator 128. The inner lock element 124 is rotatable about the axis 28, 40, 100. The outer lock element 126 is rotationally fixed about the axis 28, 40, 100. However, the actuator 128 is configured to move (e.g., axially translate) the outer lock element 126 along the axis 28, 40, 100 and the inner lock element 124 between an unlocked position (see dashed line in FIG. 6) and a locked position (see solid line in FIG. 6; see also FIG. 7). At the unlocked position, inner splines 130 of the outer lock element 126 are disengaged (e.g., spaced) from outer splines 132 of the inner lock element 124. At the locked position, the inner splines 130 of the outer lock element 126 are engaged (e.g., meshed) with the outer splines 132 of the inner lock element 124 (see also FIG. 7). With this arrangement, when the lock device 122 is unlocked and its outer lock element 126 is in the unlocked position, the inner lock element 124 may rotate (e.g., freely, unencumbered by the outer lock element 126) about the axis 28, 40, 100. However, when the lock device 122 is locked and its outer lock element 126 is in the locked position of FIG. 7, the outer lock element 126 is meshed with the inner lock element 124 and prevents rotation of the inner lock element 124 about the axis 28, 40, 100.

Figure 7:
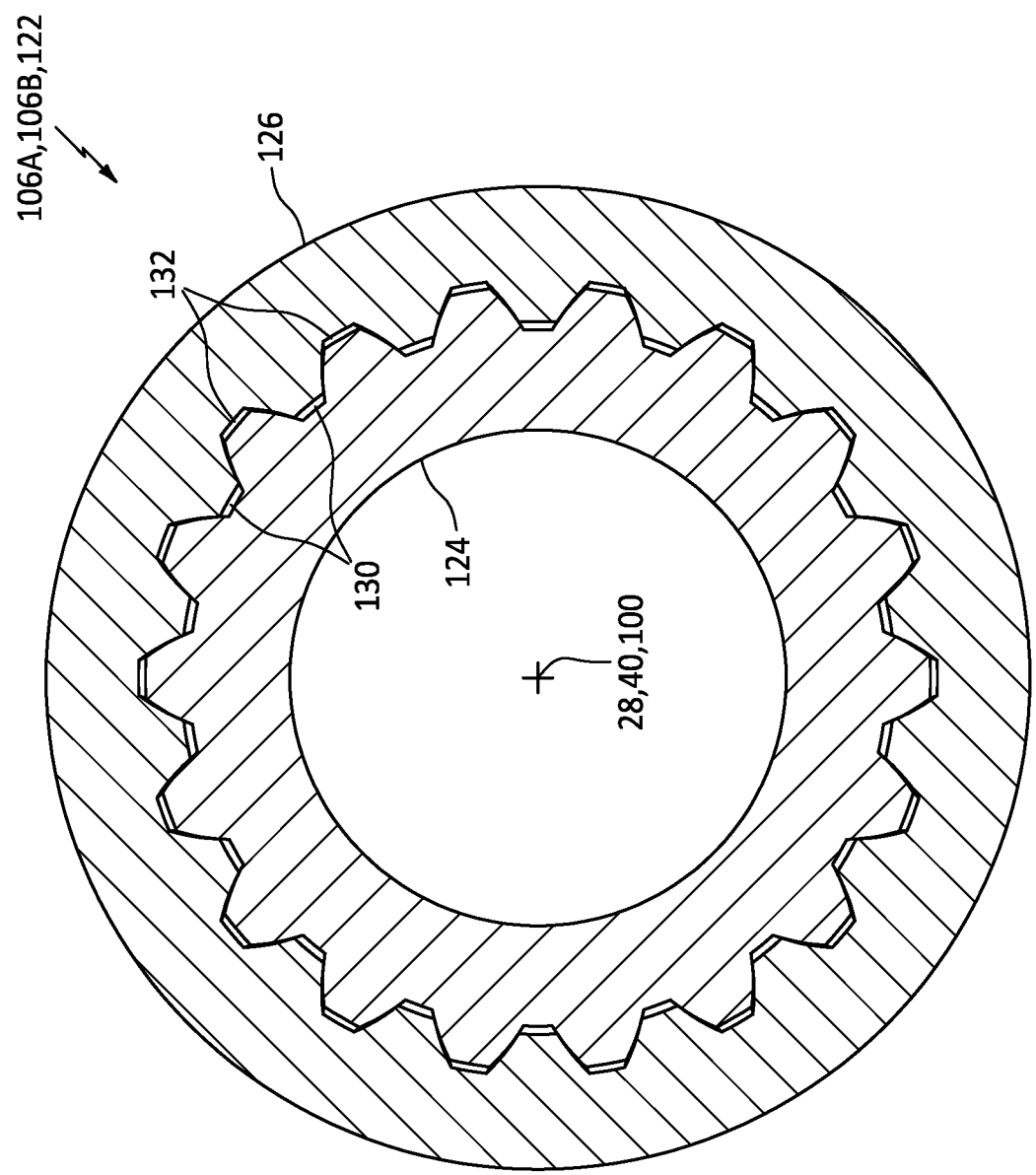
FIG. 7 is a cross-sectional illustration of the lock device of FIG. 6.

Referring to FIGS. 1 and 6, the inner lock element 124 of the first lock device 106A may be configured as part of or may be attached (directly or indirectly) to the first propulsor shaft 80, or any other element rotatable therewith. The inner lock element 124 of the second lock device 106B may be configured as part of or may be attached (directly or indirectly) to the geartrain output shaft 81, or any other element rotatable therewith. While the inner lock element 124 of FIGS. 6 and 7 is described as the rotating element and the outer lock element 126 is described as the rotationally fixed element, the operation of these elements may be switched in other embodiments. In particular, the inner lock element 124 may alternatively be configured as the rotationally fixed element and axially translatable by the actuator 128, and the outer lock element 126 may be configured as the rotating element. Furthermore, various other types of rotational lock devices are known in the art, and the present disclosure is not limited to any particular ones thereof.

Figure 8:
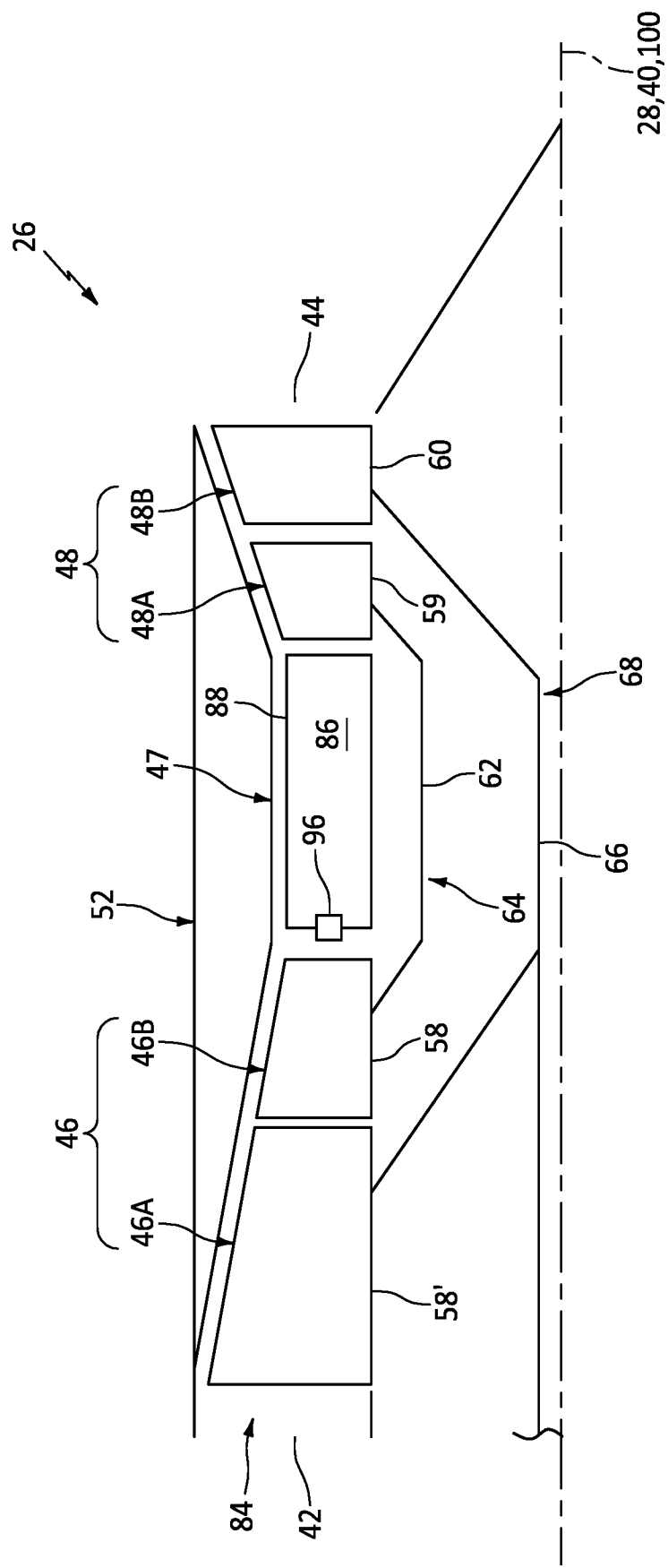
FIG. 8 is a partial, schematic illustration of a gas turbine engine core.

In some embodiments, referring to FIG. 1, the low speed rotating structure 68 may be configured without a compressor rotor. In other embodiments, referring to FIG. 8 (see also FIG. 2), the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 9:
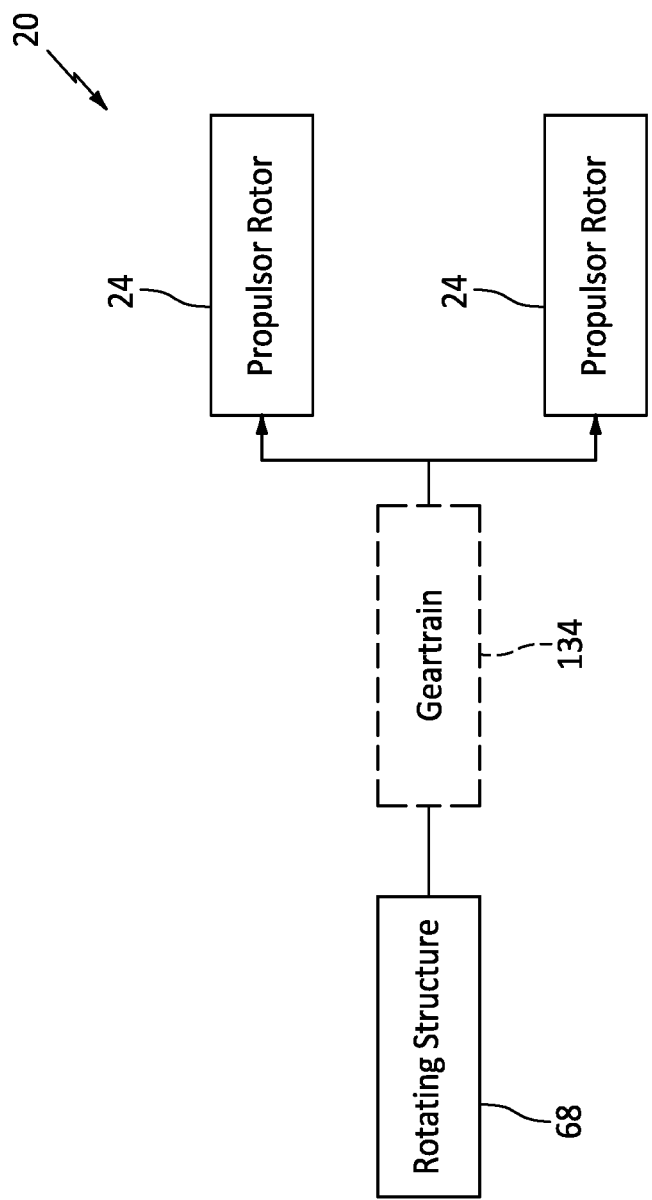
FIG. 9 is a partial, schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsor rotors 22 and 24, or a single one of the propulsor rotors 22 and 24 and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 9 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 134.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
   a geartrain comprising a sun gear, a ring gear, a plurality of intermediate gears and a carrier, the ring gear circumscribing the sun gear and rotatable about an axis, each of the plurality of intermediate gears between and meshed with the sun gear and the ring gear, each of the plurality of intermediate gears rotatably mounted to the carrier, and the carrier rotatable about the axis;
   a first propulsor rotor coupled to the carrier;
   a second propulsor rotor coupled to the sun gear; and
   a rotating structure coupled to the ring gear, the rotating structure comprising a turbine rotor, the rotating structure configured to drive rotation of the first propulsor rotor through the geartrain, and the rotating structure configured to drive rotation of the second propulsor rotor through the geartrain;
   wherein the sun gear is rotatable about the axis.

2. The assembly of claim 1, further comprising a lock device configured to lock rotation of the carrier about the axis.

3. The assembly of claim 2, wherein the lock device comprises a splined coupling.

4. The assembly of claim 1, further comprising a brake configured to brake rotation of the carrier about the axis.

5. The assembly of claim 4, wherein the brake comprises a disk brake.

6. The assembly of claim 1, further comprising a lock device configured to lock rotation of the sun gear about the axis.

7. The assembly of claim 6, wherein the lock device comprises a splined coupling.

8. The assembly of claim 1, further comprising a brake configured to brake rotation of the sun gear about the axis.

9. The assembly of claim 8, wherein the brake comprises a disk brake.

10. The assembly of claim 1, wherein
    the first propulsor rotor is rotatable about a first rotor axis; and
    the second propulsor rotor is rotatable about a second rotor axis that is angularly offset from the first rotor axis.

11. The assembly of claim 10, wherein the first rotor axis is coaxial with the axis.

12. The assembly of claim 1, wherein
    the first propulsor rotor is configured to generate propulsive force in a first direction; and
    the second propulsor rotor is configured to generate propulsive force in a second direction that is different than the first direction.

13. The assembly of claim 1, wherein at least one of
    the first propulsor rotor comprises a ducted rotor; or
    the second propulsor rotor comprises an open rotor.

14. The assembly of claim 1, further comprising:
    a gas turbine engine core including a compressor section, a combustor section, a turbine section and the rotating structure; and
    the turbine rotor within the turbine section.

15. The assembly of claim 1, wherein the second propulsor rotor comprises an open rotor.

16. The assembly of claim 1, wherein the first propulsor rotor comprises a ducted rotor and the second propulsor rotor comprises an open rotor.

17. An assembly for an aircraft, comprising:
    a geartrain comprising a sun gear, a ring gear, a plurality of intermediate gears and a carrier, the sun gear rotatable about an axis, the ring gear circumscribing the sun gear and rotatable about the axis, each of the plurality of intermediate gears between and meshed with the sun gear and the ring gear, each of the plurality of intermediate gears rotatably mounted to the carrier, and the carrier rotatable about the axis;
    a first propulsor rotor coupled to the carrier;
    a second propulsor rotor coupled to the sun gear;
    a power output coupled to the carrier or the sun gear; and
    a power input coupled to the ring gear, the power input configured to drive rotation of the power output through the geartrain.

18. The assembly of claim 17, wherein the first propulsor rotor comprises a ducted rotor and the second propulsor rotor comprises an open rotor.

* * * * *